United States Patent [19]
Ettischer

[11] 3,906,525
[45] Sept. 16, 1975

[54] PHOTOGRAPHIC CAMERA HAVING A VARIABLE SPEED MECHANICAL SHUTTER

[75] Inventor: Helmut Ettischer, Stuttgart, Germany

[73] Assignee: Eastman Kodak Company, Rochester, N.Y.

[22] Filed: Oct. 11, 1974

[21] Appl. No.: 514,035

[30] Foreign Application Priority Data
Mar. 13, 1974 Germany............................ 2411920

[52] U.S. Cl. ................. 354/149; 354/256; 354/267
[51] Int. Cl.².. G03B 15/03; G03B 9/58; G03B 9/36
[58] Field of Search .......... 354/149, 226, 245, 256, 354/259, 260, 267

[56] References Cited
UNITED STATES PATENTS
3,260,181   7/1966   Hennig et al. ...................... 354/149

OTHER PUBLICATIONS
Research Disclosure, Vol. 116, Dec. 1973, p. 122, Pub. No. 11678.

*Primary Examiner*—Robert P. Greiner
*Attorney, Agent, or Firm*—D. P. Montheith

[57] ABSTRACT

A photographic camera includes a shutter blade movable for sequentially covering and uncovering an exposure aperture. An escapement mechanism responsive to a manually settable shutter speed setting member is located in the path of the shutter for regulating shutter speed. A flash-sensing member movable between a normal, deactuated position and an actuated position, which is assumed when a photographic flash device is connected to the camera, is operably coupled to the escapement mechanism via a control lever for controlling shutter speed independent of the shutter speed setting member when the sensing member is in its actuated position. With this arrangement, shutter speed is automatically controlled for flash photographs.

5 Claims, 3 Drawing Figures

PATENTED SEP 16 1975 3,906,525

PHOTOGRAPHIC CAMERA HAVING A VARIABLE SPEED MECHANICAL SHUTTER

BACKGROUND OF THE INVENTION

1. Field of the Invention

This invention relates to photographic cameras, and more particularly to a simplified mechanical shutter control mechanism which produces various shutter speeds during daylight photography and which controls shutter speed automatically at a fixed, predetermined level during flash photography.

2. Description of the Prior Art

Cameras of the type adapted for flash as well as daylight photography and which feature variable shutter speed control devices under the control of a camera operator are known. For example, U.S. Pat. No. 3,687,028 issued to W. T. Rentschler on Aug. 29, 1972, and entitled PHOTOGRAPHIC CAMERA WITH FLASH MECHANISM discloses a shutter control mechanism of this type in which a shutter speed setting member is brought into various positions affecting the speed of a pivotal shutter blade of the type generally known as an inertia shutter. The shutter speed setting member further includes the provision for manually setting the camera for a fixed-speed flash exposure in accordance with flash picture-taking conditions.

With cameras adapted for flash photography and in which shutter speed is controlled mechanically, it is desirable to have the feature which automatically sets shutter speed when a flash lamp is coupled to the camera. This is desirable for several reasons, one being that it makes the camera more automatic and thereby makes it easier for the camera to be used. Another reason is that this feature avoids the possibility of the camera operator selecting an incorrect shutter speed or forgetting to set the camera at a speed suitable for flash photography.

German Auslegeschrift 1,522,012 discloses exposure control apparatus in which a shutter speed setting member is brought into various positions affecting exposure time in response to either a sensing member operably associated with a measuring instrument indicator or an attached flash lamp. This apparatus requires, however, relatively complicated control, besides which the use of a measuring instrument gives rise to additional problems concerning space and cost, the result being that such apparatus is not practical for compact cameras intended to be sold at low prices.

SUMMARY OF THE INVENTION

It is an object of the present invention to provide an improved shutter speed control mechanism for a photographic camera.

It is a further object of the invention to provide a mechanically controlled shutter mechanism in which shutter speed is set automatically for a flash picture.

It is a still further object of the invention to provide a shutter control mechanism in which shutter speed is regulated by an escapement mechanism.

It is a further object of the invention to provide a shutter control mechanism of the aforementioned type in which shutter speed is controlled automatically for a flash picture independent of a shutter speed setting member.

It is yet another object of the instant invention to provide a shutter speed control mechanism which is of simple design, economical to manufacture, and is of strong construction for dependable operation.

In accordance with the above objects, there is provided a photographic camera having an exposure aperture and means adapted for releasably receiving a photographic flash device. An apertured shutter blade is mounted for movement across the exposure aperture for controlling film exposure. A resiliently biased retarding mechanism is mounted for movement in association with the shutter between one of a plurality of initial positions and an extreme position, each of the initial positions being functionally related to a particular shutter speed. A control member responsive to a shutter speed setting member is adapted to locate the retarding mechanism in its initial positions. A flash-sensing probe which communicates with the flash-receiving means is movable between (1) a normal, de-actuated position and (2) an actuated position which is assumed when a flash device is mounted in the receiving means. A control level responsive to the flash-sensing probe bias the control member to enable the retarding mechanism to be set in a particular initial position which is independent of the shutter speed setting member when the sensing probe is in its actuated position whereby shutter speed is automatically controlled in a flash mode of operation.

The invention, and its objects and advantages, will become more apparent in the detailed description of a preferred embodiment presented below.

BRIEF DESCRIPTION OF THE DRAWING

In the detailed description of a preferred embodiment of the invention presented hereinafter, reference is made to the accompanying drawing, in which.

DESCRIPTION OF A PREFERRED EMBODIMENT

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 1:
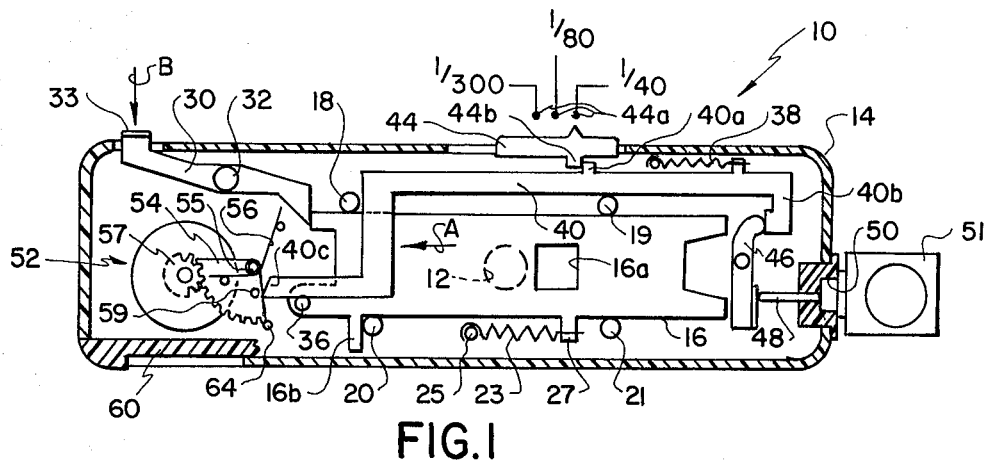
FIG. 1 is a cross-sectional view of a camera with a flash attached and showing an apertured shutter blade, an escapement mechanism for regulating shutter speed and a control mechanism operably associated with a shutter speed setting member and a flash-receiving receptacle for controlling film exposure time.

There is shown in FIG. 1 a camera denoted generally 10 having an exposure aperture 12 and a housing 14 in which is included an apertured shutter blade 16 mounted for slidable movement between spaced guide pins 18, 19, 20, 21. Shutter blade 16 is biased in the direction of arrow A by a spring 23, one end of which is connected to a stationary pin 25, the other end of which is hooked about projection 27 intregally connected to the shutter blade. Shutter blade 16 is releasibly retained in a cocked light-blocking position covering exposure aperture 12 by a shutter release member 30 which is mounted for pivotal movement about a pin 32 and which is normally aligned by means not shown that release button 33 protrudes through housing 14 so as to be accessible to a camera operator.

An elongate control member 40 is mounted for slidable movement in the direction of arrow A by a spring 38 which is mounted in a manner similar to that of spring 23. Control member 40 by virtue of its projection 40a and spring 38 and suitable guide means not shown abuttingly engages a shutter speed setting member 44 which projects from housing 14 and which can be engaged in a known manner to be positioned at selected points along shutter speed scale 44a. Via its arm 40b control member 40 abuttingly engages a pivotally mounted shift lever 46 which, in turn, cooperatively engages a flash sensing pin 48. Pin 48 is mounted for slidable movement perpendicular to the base of a flash lamp socket 50 between a normal position shown in FIGS. 2 and 3 and an actuated position shown in FIG. 1, the latter position being assumed when a flash device such as a flash cube 51 is inserted into socket 50.

Figure 2:
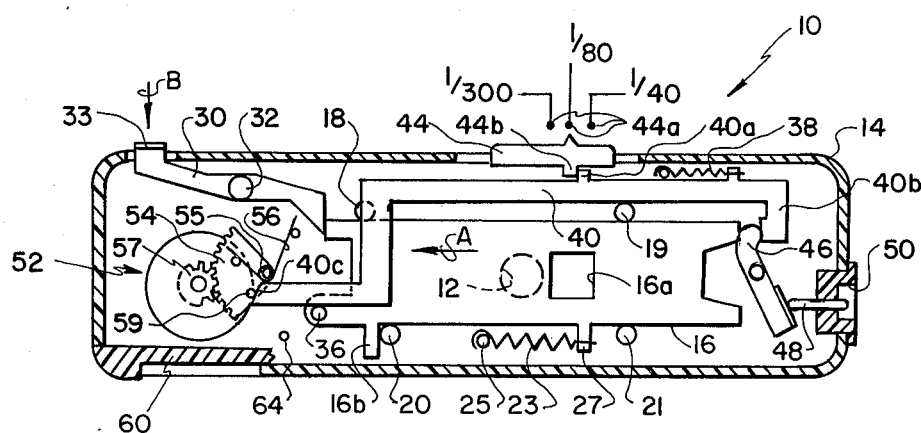
FIGS. 2 and 3 show cross-sectional views of the camera, similar to FIG. 1, only without a flash and showing the escapement mechanism in different operational positions determined by the shutter speed setting member.
Figure 3:
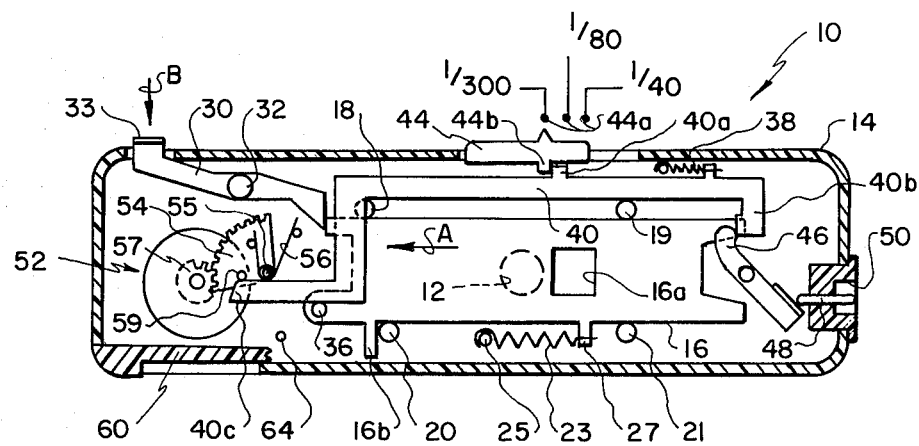

An escapement mechanism denoted generally 52 for regulating shutter speed is mounted in camera 10 in the path of shutter 16 as shown. Shutter speed is determined by the degree to which escapement mechanism 52 acts to restrain or retard movement of blade 16 as aperture 16a moves from right to left across exposure aperture 12, the degree of restraint being determined as a function of the initial position at which the escapement mechanism is set. Mechanism 52 comprises a spring biased toothed sector 54 pivotally mounted about a pin 55 so as to cooperatively engage the teeth of restraining mass 57. Sector 54 is normally maintained in an initial position, shown in FIG. 1, due to spring 56 prior to commencement of shutter exposure movement but may be brought into various other initial positions two of which are shown in FIGS. 2 and 3 by virtue of nose 40c of control member 40 which operates in conjunction with pin 59 to bias the sector in a clockwise direction into such other positions.

Shutter blade 16 is regulated by escapement mechanism 52 through pin 36 which is fixedly mounted on the nose of the shutter and which engages sector 54 during exposure movement. As is shown in FIGS. 1–3, when blade 16 is in its cocked position, pin 36 is disengaged from escapement mechanism 52 regardless of the position of sector 54. Shutter blade 16 is not coupled to escapement mechanism 52 during initial film exposure movement until shutter aperture 16a is aligned with exposure aperture 12 to a more or less degree. With this arrangement, a high degree of efficiency is attained for all shutter speeds.

In a manner well known in the art, a shutter reset member 60 mounted in the lower left hand corner of camera 10 operates to reset shutter 16 through its engagement with depending finger member 16b to set camera 10 for a picture-taking operation.

When a photographic flash device, such as flash cube 51, is inserted into socket 50 as is shown in FIG. 1 control member 40 is slid in a direction opposite to arrow A by virtue of the interengagement between flash sensing probe 48 and lever 46 and nose 40c is disengaged from pin 59 on toothed sector 54. Under the influence of weak spring 56, sector 54 abuttingly engages stop pin 64, which is the initial position which gives rise to the greatest restraint possible on blade 16 and which thereby produces the longest exposure interval which preferably is on the order of 1/40 second.

Escapement mechanism 52 also assumes this initial position during daylight photography when shutter speed setting member 44 is set to 1/40 second as is also shown in FIG. 1. In this case, detent 44b abuttingly engages projection 40a to disengage nose 40c from sector 54.

When release button 33 is actuated in the direction of arrow B shutter blade 16 is thereby released to run down in the direction of arrow A. Initially the shutter runs down unrestrained then pin 36 strikes toothed sector 54. When this happens, aperture 16a is aligned with lens aperture 12. Escapement mechanism 52 then acts to retard further movement of shutter 16 as aperture 16a continues to move across exposure aperture 12. The result is that film (not shown) is exposed to scene light or flash light for approximately the aforementioned 1/40 second.

If camera 10 is set to a shorter exposure time, for example, 1/80 second, as is illustrated in FIG. 2, toothed sector 54 is pivoted slightly in the clockwise direction by nose 40c which is in engagement with pin 59. Escapement mechanism 52 accordingly assumes an initial position which to a less degree retards shutter blade 16 as it runs down. That is, when release button 33 is actuated, shutter 16 is permitted this time to move further across exposure aperture 12 unretarded before pin 36 engages sector 54. As a result the distance shutter 16 is required to travel under the retarding effect of mechanism 52 before aperture 12 is covered and an exposure terminated is reduced.

If shutter speed setting member 44 is set to an even shorter exposure time, for example, 1/300 second as is shown in FIG. 3, nose 40c pivots tooth sector 54 clockwise until the sector completely clears the range of movement of shutter blade pin 36. With this arrangement, shutter 16 is not affected by escapement mechanism 52 and a very brief exposure time, 1/300 second, is achieved.

In accordance with the teachings of this invention, when a photographic flash device is attached to camera 10, shutter speed is automatically set regardless of the position of shutter speed setting member 44 for flash exposures. In a daylight operational mode shutter speed is controlled via the shutter speed setting member. The simple construction of camera 10, economic as regards both parts and space, makes it especially suitable for inexpensive production and for incorporation in cameras which are of a small, compact size.

The invention has been described in detail with particular reference to a preferred embodiment thereof, but it will be understood that variations and modifications can be effected within the spirit and scope of the invention.

I claim:

1. A photographic camera having an exposure aperture and means adapted for releasably receiving a photographic flash device, said camera comprising:
   a. shutter means movable for sequentially covering and uncovering the exposure aperture;
   b. a shutter speed setting member settable over a range of positions each of which is indicative of a particular shutter speed;
   c. movement retarding means for regulating shutter speed movable in association with said shutter means over an operational path between (1) one of a plurality of initial positions and (2) an extreme position, each of said initial positions being functionally related to a particular shutter speed;

d. a control member responsive to said shutter speed setting member for locating said movement retarding means in said initial positions;

e. a flash device sensing member communicating with said flash device receiving means and mounted for movement between (1) a normal, deactuated position and (2) an actuated position which is assumed when a photographic flash device is received by said camera; and f. a control lever coupling said flash device sensing member to said control member for enabling said movement retarding means to be positioned in a particular one of said initial positions when said sensing member is in said actuated position which is independent of said shutter speed setting member.

2. A camera as is claimed in claim 1 wherein said shutter means includes means defining a projection adapted to engage said movement retarding means during aperture uncovering movement, said projection being located a predetermined distance from said movement retarding means when said shutter means is covering the exposure aperture wherein said movement retarding means is ineffective to regulate shutter speed during initial aperture uncovering movement.

3. A camera as is claimed in claim 1 wherein a. a spring member resiliently engages said control member, said spring member being located to produce a bias force in a direction to cooperatively couple said control member to said shutter speed setting member; and b. said control lever is located with respect to said control member to bias said control member in a direction opposed to said bias force when a flash device is coupled to said flash-receiving means.

4. A photographic camera having an exposure aperture and means for releasably receiving a photographic flash lamp, said camera comprising:

a. apertured shutter means movably mounted for sequentially unblocking and blocking scene light from the exposure aperture;

b. a shutter speed setting member settable over a range of positions each of which is indicative of a particular shutter speed;

c. an escapement mechanism comprising a restraining mass operably coupled to a controllable indexing element, said indexing element being located to be movable in association with said shutter means under the influence of said restraining mass over an operational path defined at one end by a plurality of initial positions and at the other end by a final position with the distance of said path being functionally related to shutter speed;

d. a control member coupling said shutter speed setting member to said indexing element movable in response to said shutter speed setting member for locating said indexing element in said initial positions;

e. a flash device sensing member communicating with said flash device receiving means and mounted for movement between (1) a normal, deactuated position and (2) an actuated position which is assumed when a photographic flash device is received by said camera; and f. a control lever arranged to follow said flash device sensing member and adapted to bias said control member when said sensing member is in said actuated position to position said indexing element in a predetermined initial position which is independent of said shutter speed setting member, whereby shutter speed is set automatically for flash exposure.

5. A camera as is defined in claim 4 wherein a. a first spring member is coupled to said indexing element for urging said element independent of said control member into a particular initial position which corresponds to the slowest shutter speed; and b. a second spring member resiliently biases said control member in a direction to engage said indexing element, said first and second spring members being constructed and located with respect to each other wherein said control member is rendered effective to position said indexing element against the force of said first spring member when said flash device sensing member is in said deactuated position.

* * * * *